United States Patent
Gaknoki et al.

(10) Patent No.: US 9,320,091 B2
(45) Date of Patent: *Apr. 19, 2016

(54) DIMMING CONTROL FOR A SWITCHING POWER SUPPLY

(71) Applicant: Power Integrations, Inc., San Jose, CA (US)

(72) Inventors: Yury Gaknoki, San Jose, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/062,227

(22) Filed: Oct. 24, 2013

(65) Prior Publication Data

US 2014/0049241 A1 Feb. 20, 2014

Related U.S. Application Data

(63) Continuation of application No. 13/550,444, filed on Jul. 16, 2012, now Pat. No. 8,593,129, which is a continuation of application No. 12/764,026, filed on Apr. 20, 2010, now Pat. No. 8,242,766.

(51) Int. Cl.
   *H02M 7/12* (2006.01)
   *H05B 33/08* (2006.01)
   *H02M 3/335* (2006.01)

(52) U.S. Cl.
   CPC ....... *H05B 33/0815* (2013.01); *H02M 3/33507* (2013.01); *H05B 33/0848* (2013.01); *Y02B 20/346* (2013.01)

(58) Field of Classification Search
   CPC ....... H02M 7/2176; H02M 7/12; H02M 7/15; H02M 1/081; H02M 2001/007
   USPC .......... 323/300, 905, 237–239, 241–244, 246
   See application file for complete search history.

(56) References Cited

U.S. PATENT DOCUMENTS 7,256,554 B2   8/2007   Lys
8,242,766 B2   8/2012   Gaknoki et al.
(Continued)

FOREIGN PATENT DOCUMENTS

CN   1625319 A   6/2005
CN   1937384 A   3/2007
WO   WO 2011/117770 A1   9/2011

OTHER PUBLICATIONS

EP 11162056—European Search Report issued Oct. 6, 2011 (5 pages).
Michael Datta and Gregory Campbell, priority document for WO2011/117770, Mar. 25, 2010, pp. 1-36.
EP 11162056.3 —European Office Action, issued May 7, 2013 (5 pages).
(Continued)

*Primary Examiner* — Harry Behm
(74) *Attorney, Agent, or Firm* — Blakely Sokoloff Taylor & Zafman LLP

(57) ABSTRACT

An example controller includes a measurement block and a drive block. The measurement block determines an amount of time that a dimmer circuit, that is coupled to an input of a power supply, disconnects an ac input voltage. The drive block generates a drive signal to control switching of a switch included in the power supply. The drive block operates a closed loop dimming control when the amount of time is less than or equal to a threshold and operates an open loop dimming control when the amount of time is greater than the threshold. The closed loop dimming control includes setting one or more operating conditions of the drive signal in response to a feedback signal that is representative of an output quantity of the power supply. The open loop dimming control includes holding the one or more operating conditions of the drive signal to a value.

23 Claims, 10 Drawing Sheets

(56) References Cited

U.S. PATENT DOCUMENTS

| | | | |
|---|---|---|---|
| 8,593,129 B2* | 11/2013 | Gaknoki et al. | 323/300 |
| 2006/0208667 A1 | 9/2006 | Lys et al. | |
| 2006/0255746 A1 | 11/2006 | Kumar et al. | |
| 2007/0182338 A1 | 8/2007 | Shteynberg et al. | |
| 2008/0224633 A1* | 9/2008 | Melanson et al. | 315/292 |
| 2009/0160369 A1 | 6/2009 | Godbole et al. | |
| 2009/0167203 A1 | 7/2009 | Dahlman et al. | |

OTHER PUBLICATIONS

JP 2011-092895—First Japanese Office Action with English Translation, issued Dec. 11, 2015 (4 pages).

CN 201110099807.1—Chinese First Office Action and Search Report, issued Jul. 1, 2014, with English Translation (11 pages).

JP 2011-092895—First Japanese Office Action with English Translation, issued Dec. 11, 2014 (4 pages).

* cited by examiner

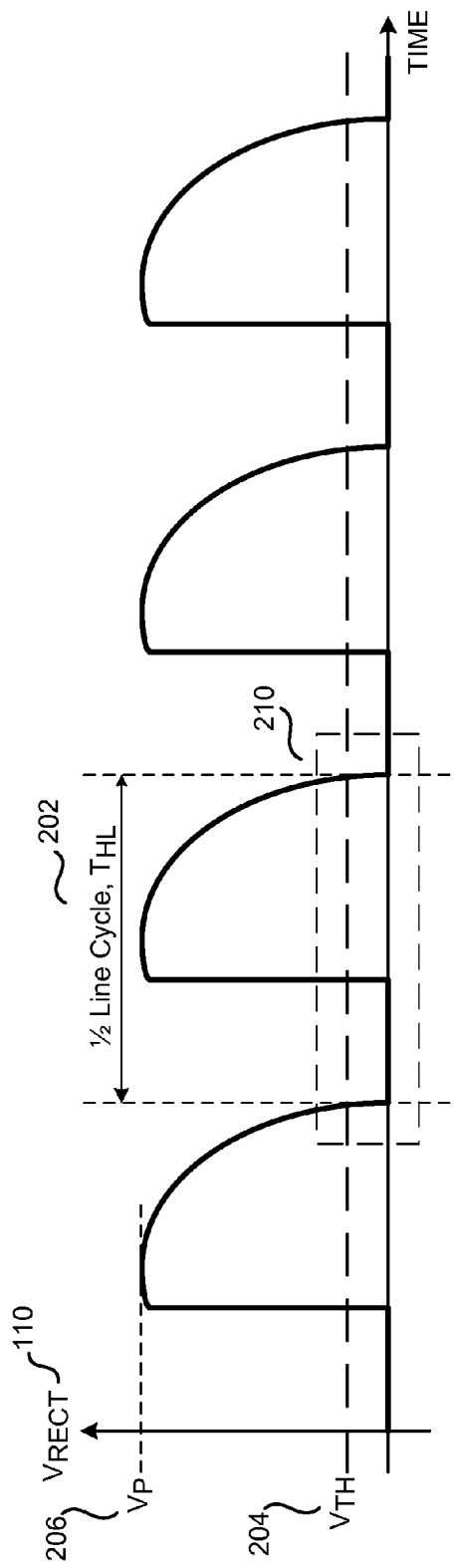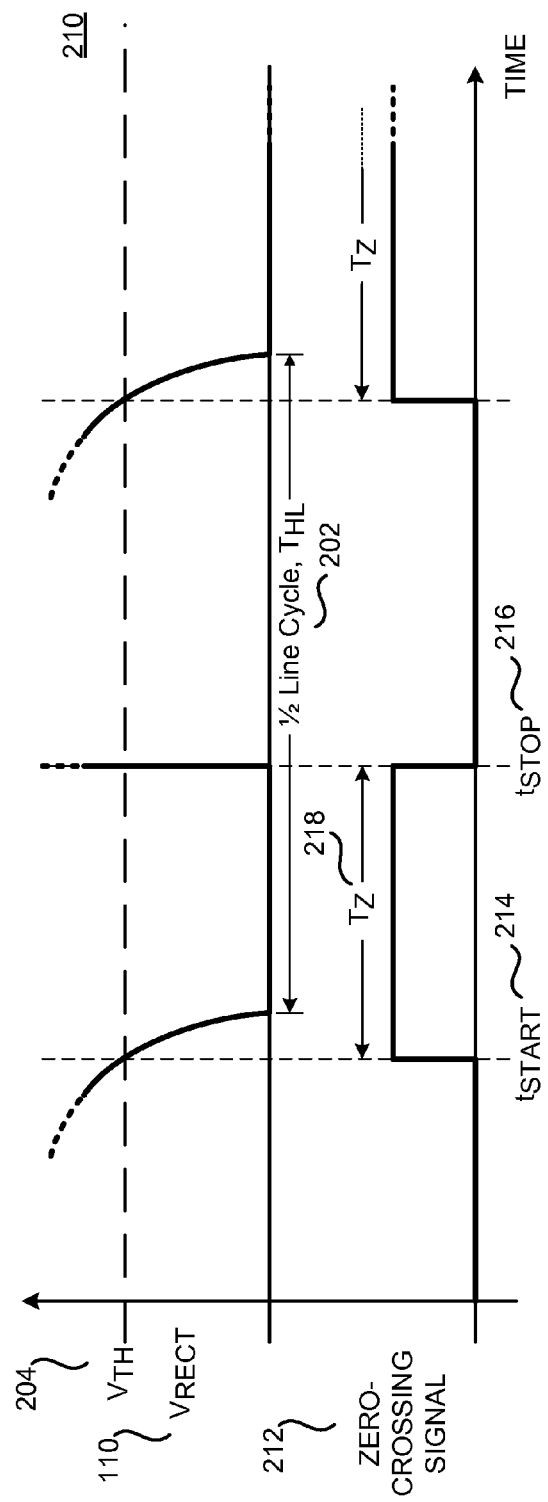

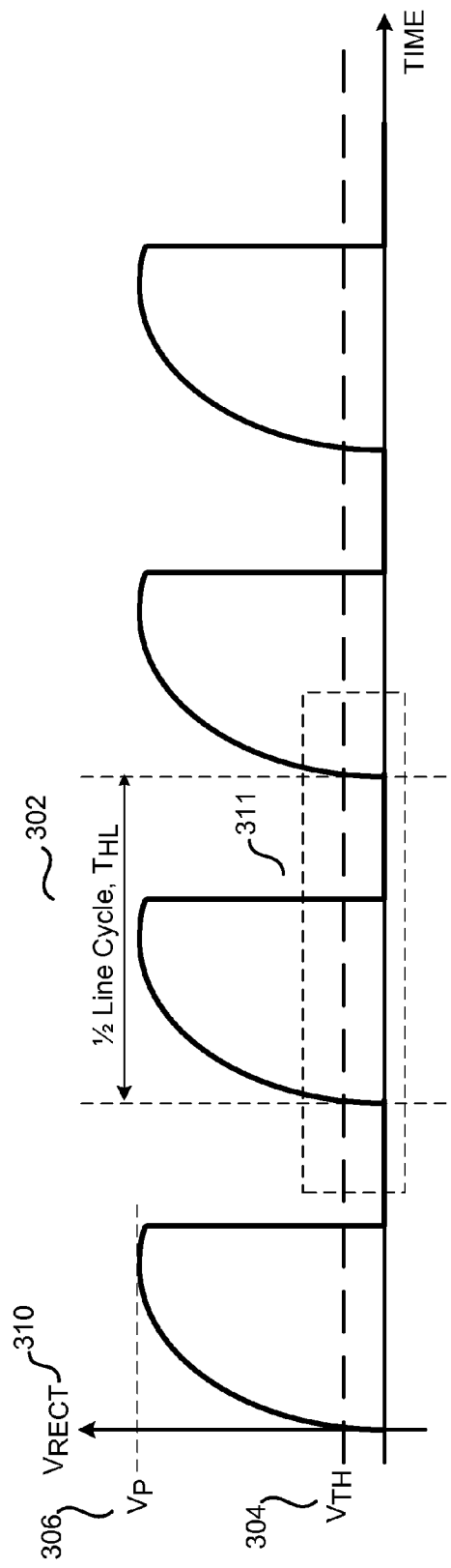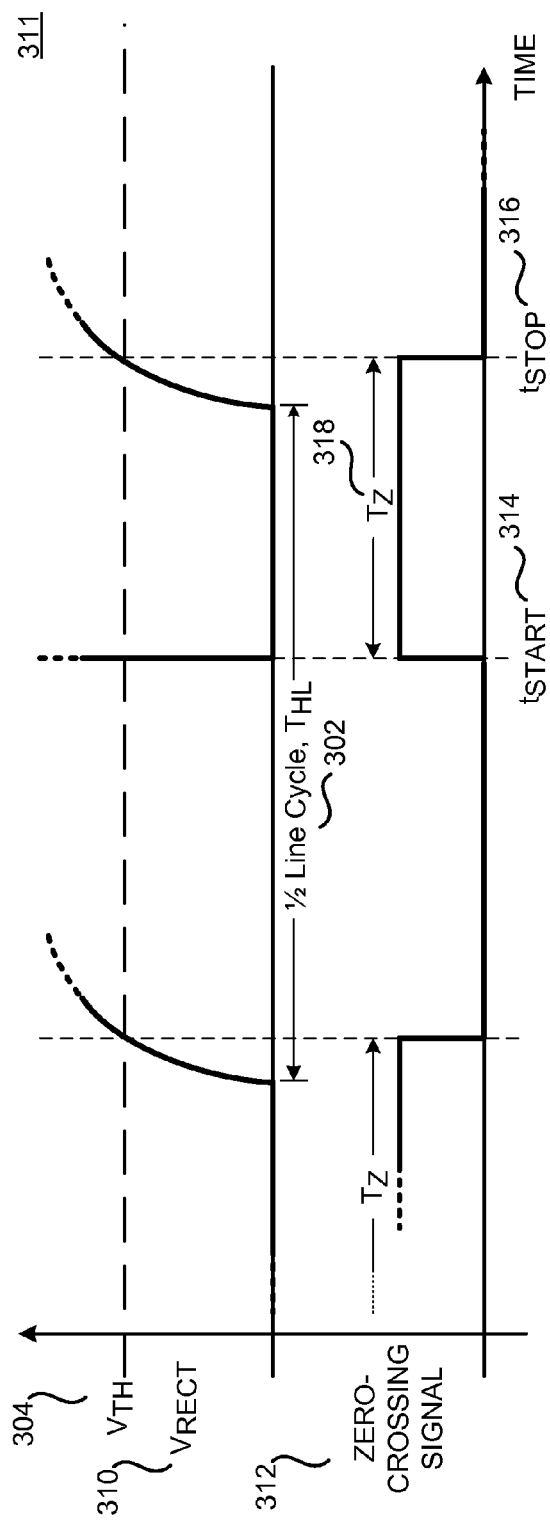

700

| VALUE | B1 | B2 | B3 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

FIG. 7

DIMMING CONTROL FOR A SWITCHING POWER SUPPLY

RELATED APPLICATIONS

The present application is a continuation of U.S. patent application Ser. No. 13/550,444, filed Jul. 16, 2012, which is a continuation of U.S. patent application Ser. No. 12/764,026, filed Apr. 20, 2010, now issued as U.S. Pat. No. 8,242,766. U.S. patent application Ser. No. 13/550,444 and U.S. Pat. No. 8,242,766 are hereby incorporated herein by reference.

TECHNICAL FIELD

The present invention relates generally to power supplies, and more specifically to power supplies utilized with dimmer circuits.

BACKGROUND INFORMATION

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. In operation, a switch is utilized to provide the desired output by varying the duty cycle (typically the ratio of the on time of the switch to the total switching period), varying the switching frequency or varying the number of pulses per unit time of the switch in a switched mode power supply.

In one type of dimming for lighting applications, a triac dimmer circuit typically removes a portion of the ac input voltage to limit the amount of voltage and current supplied to an incandescent lamp. This is known as phase dimming because it is often convenient to designate the position of the missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit removes. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees.

Although phase angle dimming works well with incandescent lamps that receive the altered ac input voltage directly, it typically creates problems for light emitting diode (LED) lamps. LED lamps require a regulated power supply to provide regulated current and voltage from the ac power line. Conventional regulated power supply controllers typically don't respond desirably to a removal of a portion of the ac input voltage by a triac dimmer circuit. Conventional power supplies are typically designed to ignore distortions of the ac input voltage and to deliver a constant regulated output until a low input voltage causes them to shut off completely. Thus, as a result of phase dimming, a conventional power supply is likely to produce unacceptable results such as flickering of the LED lamp, flashing of the LED lamp at high phase angles, and color shifting of the LED lamp.

Thus, a conventional power supply controller may be designed to implement dimming of the output of the power supply in response phase dimming at the input, such as by a triac dimmer. One type of dimming control used by conventional power supply controllers is referred to as closed loop dimming. For closed loop dimming control, the conventional power supply controller may actively sense one or more output quantities to regulate the output of the power supply. In addition, the conventional power supply controller that is designed for phase dimming may respond to triac dimmer by directly sensing the dimmer voltage output (in other words, the ac input voltage after the triac dimmer circuit has removed a portion of the ac input voltage) to determine the amount of dimming requested. However, at high phase angles (corresponding to the triac dimmer circuit removing a large portion of the ac input voltage) the triac dimmer output becomes less symmetric. In other words, even though the triac dimmer is set to provide a constant phase angle, variances remain in the resultant phase angle at every half line cycle resulting in the triac dimmer output being not symmetric. The asymmetry of the triac at high phase angles tends to produce unacceptable results such as flickering of the LED lamp. Closed loop dimming control generally magnifies unacceptable results such as flickering since the power supply controller would be responding to a changing output power of the power supply (due to the changing phase angle) at every half line cycle.

Another type of dimming control used by conventional power supply controllers does not sense the dimmer voltage output but instead utilizes the inability of the power supply to regulate at low input voltages. As mentioned above, the power supply provides a constant regulated output until a low input voltage causes them to shut off completely. However, the shut off of the power supply is not instantaneous. Instead, the power supply becomes unable to regulate the output at a low input voltage and causes the output to begin dimming. The triac dimmer circuit removes enough of the ac input voltage such that it causes the output of the power supply to begin dimming. As such, dimming often occurs at high phase angles. When dimming occurs at high phase angles, the dimming transition occurs quickly since the range of dimming is small. In addition, depending on the load of the power supply, dimming may occur at different phase angles.

BRIEF DESCRIPTION OF THE DRAWINGS

The above and other aspects, features and advantages of several embodiments of the present invention will be more apparent from the following more particular description thereof, presented in conjunction with the following drawings.

FIG. 2A is a diagram illustrating an example rectified input voltage waveform of the switching power supply of FIG. 1 in accordance with an embodiment of the present invention.

FIG. 2B is a diagram illustrating a section of the example rectified input voltage of FIG. 2A and corresponding zero-crossing signal in accordance with an embodiment of the present invention.

FIG. 3A is a diagram illustrating another example rectified input voltage waveform of a switching power supply in accordance with an embodiment of the present invention.

FIG. 3B is a diagram illustrating a section of the example rectified input voltage of FIG. 3A and corresponding zero-crossing signal in accordance with an embodiment of the present invention.

FIG. 7 is a table illustrating example counts of the counter of FIG. 5.

Figure 1:
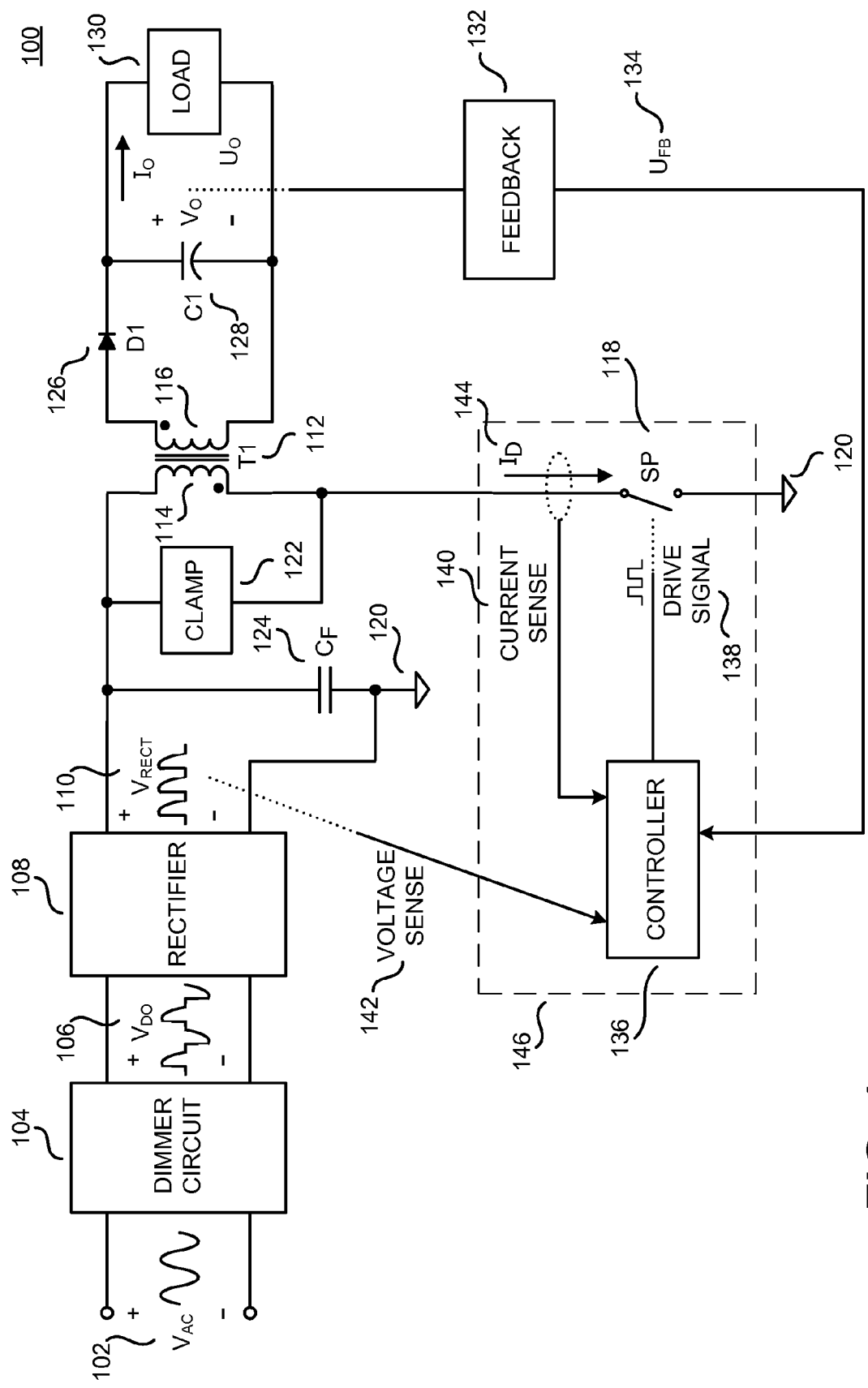
FIG. 1 is a functional block diagram illustrating an example switching power supply with a dimmer circuit utilizing a controller in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a controller and power supply for a closed loop dimming control to open loop dimming control are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

For phase dimming applications, including those for light emitting diodes (LED), a phase dimmer circuit typically removes a portion of the ac input voltage at every half line cycle to limit the amount of voltage and current supplied to the LEDs. As mentioned above, typically, the phase angle is a measure of how many degrees of each half line cycle the dimmer circuit removes. For example, the half line cycle of the ac input voltage may have a total of 180 degrees. As such, removal of half the ac input voltage in a half line cycle by the dimmer circuit corresponds to a phase angle of 90 degrees. In another example, removal of a quarter of the ac input voltage in a half line cycle may correspond to a phase angle of 45 degrees. A triac dimmer circuit is one example of the phase dimmer circuit. At high phase angles the triac dimmer output becomes less symmetric. In other words, even though the triac dimmer is set to provide a constant phase angle, in reality there are variances to the resultant phase angle at every half line cycle and the triac dimmer output is not symmetric.

For embodiments of the present invention, a power supply controller transitions from closed loop dimming control to open loop dimming control when the phase angle reaches a phase threshold. As mentioned above, closed loop dimming control magnifies undesirable results such as flickering for an LED lamp at high phase angles. On the other hand, if the power supply control does not respond to the triac dimmer, dimming does not occur until a high phase angle is reached. For embodiments of the present invention, the power supply controller transitions from closed loop dimming to open loop dimming to reduce undesirable results to the LED lamp. For closed loop dimming control, the power supply controller may actively sense the power supply output to regulate the output of the power supply. In other words, in closed loop dimming the one or more drive signal operating conditions are responsive to the power supply output. In open loop dimming control, the power supply controller does not sense the power supply output to regulate the output and does not control switching of the switch in response to one or more output quantities. In other words, in open loop dimming one or more drive signal operating conditions are not responsive to the power supply output. In one embodiment, the power supply controller holds one or more drive signal operating conditions, independent of a feedback signal, when the phase angle sensed by the controller is greater than a phase threshold. By holding one or more drive signal operating conditions, the controller transitions to open loop dimming control from closed loop dimming control since one or more drive signal operating conditions are not responsive to the power supply output.

Referring first to FIG. 1, a functional block diagram of an example switching power supply 100 is illustrated including ac input voltage $V_{AC}$ 102, a dimmer circuit 104, a dimmer output voltage $V_{DO}$ 106, a rectifier 108, a rectified voltage $V_{RECT}$ 110, an energy transfer element T1 112 with a primary winding 114 and a secondary winding 116, a switch SP 118, an input return 120, a clamp circuit 122, a filter capacitor $C_F$ 124, a rectifier D1 126, an output capacitor C1 128, an output quantity $U_O$, an output voltage $V_O$, an output current $I_O$, a feedback circuit 132, a feedback signal $U_{FB}$ 134, a controller 136, a drive signal 138, a current sense input signal 140, a voltage sense input signal 142, and switch current $I_D$ 144. Also illustrated in FIG. 1 is a load 130 coupled to the output of switching power supply 100. The example switching power supply 100 illustrated in FIG. 1 is configured generally as a flyback regulator, which is one example of a switching power supply topology which may benefit from the teachings of the present invention. However, it is appreciated that other known topologies and configurations of switching power supply regulators may also benefit from the teachings of the present invention.

The switching power supply 100 provides output power to the load 130 from an unregulated input voltage. In one embodiment, the input voltage is the ac input voltage $V_{AC}$ 102. In another embodiment, the input voltage is a rectified ac input voltage such as rectified voltage $V_{RECT}$ 110. As shown, dimmer circuit 104 receives the ac input voltage $V_{AC}$ 102 and produces the dimmer output voltage $V_{DO}$ 106. In one embodiment, the dimmer circuit 104 may be a phase dimming circuit such as a triac phase dimmer. The dimmer circuit 104 further couples to the rectifier 108 and the dimmer output voltage $V_{DO}$ 106 is received by the rectifier 108. The rectifier 108 outputs rectified voltage $V_{RECT}$ 110. In one embodiment, rectifier 108 may be a bridge rectifier. The rectifier 108 further couples to the energy transfer element T1 112. In some embodiments of the present invention, the energy transfer element T1 112 may be a coupled inductor. In other embodiments, the energy transfer element T1 112 may be a transformer. In the example of FIG. 1, the energy transfer element T1 112 includes two windings, a primary winding 114 and a secondary winding 116. However, it should be appreciated that the energy transfer element T1 112 may have more than two windings. The primary winding 114 is further coupled to switch SP 118, which is then further coupled to input return 120. In one embodiment, the switch SP 118 may be a transistor such as a metal-oxide-semiconductor field-effect transistor (MOSFET). In another example, controller 136 may be implemented as a monolithic integrated circuit or may be implemented with discrete electrical components or a combination of discrete and integrated components. Controller 136 and switch SP 118 could form part of an integrated circuit 146 that is manufactured as either a hybrid or monolithic integrated circuit.

In addition, the clamp circuit 122 is illustrated in the embodiment of FIG. 1 as being coupled across the primary winding 114 of the energy transfer element T1 112. The filter capacitor $C_F$ 124 may couple to the rectifier 108 and input return 120. In other words, the filter capacitor $C_F$ 124 may couple across the primary winding 114 and switch SP 118. Secondary winding 116 of the energy transfer element T1 112 is coupled to the rectifier D1 126. In the example of FIG. 1, the rectifier D1 126 is exemplified as a diode. However, in some embodiments the rectifier D1 126 may be a transistor used as a synchronous rectifier. Both the output capacitor C1 128 and the load 130 are shown in FIG. 1 as being coupled to the rectifier D1 126. An output is provided to the load 130 and may be provided as either a regulated output voltage $V_O$, regulated output current $I_O$, or a combination of the two. In one embodiment, the load 130 may be a light emitting diode (LED) array.

The switched mode power supply 100 further comprises circuitry to regulate the output which is exemplified as output quantity $U_O$. In general, the output quantity $U_O$ is either an output voltage $V_O$, output current $I_O$, or a combination of the two. A feedback circuit 132 is coupled to sense the output quantity $U_O$ from the output of the switched mode power supply 100 and produces the feedback signal $U_{FB}$ 134. In other embodiments, the feedback signal $U_{FB}$ 134 may be derived from sensing one or more quantities on the input side of the transformer that are representative of the output quantity $U_O$. The feedback circuit 132 is further coupled to the controller 136 such that the controller 136 receives the feedback signal $U_{FB}$ 134. The controller 136 further receives the current sense input signal 140. The current sense input signal 140 is representative of the switch current $I_D$ 144 in the switch SP 118. In addition, the switch SP 118 receives the drive signal 138 from the controller 136. The controller 136 may also receive the voltage sense input signal 142. In the example of FIG. 1, the voltage sense input signal 142 is representative of the rectified voltage $V_{RECT}$ 110. However, in other embodiments the voltage sense signal 142 may be representative of the dimmer output voltage $V_{DO}$ 106.

In operation, the switching power supply 100 of FIG. 1 provides output power to the load 130 from an unregulated input such as the ac input voltage $V_{AC}$ 102. The dimmer circuit 104 may be utilized when the load 130 of the switching power supply 100 is a LED array to limit the amount of power delivered to the power supply. As a result the current delivered to the load of LED arrays is limited and the LED array dims. The dimmer circuit 104 disconnects the ac input voltage $V_{AC}$ 102 when the ac input voltage $V_{AC}$ 102 crosses zero voltage. After a given amount of time, the dimmer circuit 104 reconnects the ac input voltage $V_{AC}$ 102 with the power supply 100. In other words, the dimmer circuit 104 may interrupt the phase of the ac input voltage $V_{AC}$ 102. Depending on the amount of dimming wanted the dimmer circuit 104 controls the amount of time the ac input voltage $V_{AC}$ 102 is disconnected from the power supply. In general, the more dimming wanted corresponds to a longer period of time during which the dimming circuit 104 disconnects the ac input voltage $V_{AC}$ 102. As will be further discussed, the phase angle may be determined by measuring the period of time during which the dimming circuit 104 disconnects the ac input voltage $V_{AC}$ 102. Utilizing the determined phase angle, the controller 136 may transition between closed loop dimming control and open loop dimming control.

The dimmer circuit 104 produces the dimmer output voltage $V_{DO}$ 106 which is received by rectifier 108. The rectifier 108 produces the rectified voltage $V_{RECT}$ 110. The filter capacitor $C_F$ 124 filters the high frequency current from the switch SP 118. For other applications, the filter capacitor $C_F$ 124 may be large enough such that a substantially dc voltage is applied to the energy transfer element T1 112. However, for power supplies with power factor correction (PFC), a small filter capacitor $C_F$ 124 may be utilized to allow the voltage applied to the energy transfer element T1 112 to substantially follow the rectified voltage $V_{RECT}$ 110. As such, the value of the filter capacitor $C_F$ 124 may be chosen such that the voltage on the filter capacitor $C_F$ 124 reaches substantially zero during each half-line cycle of the ac input voltage $V_{AC}$ 102. Or in other words, the voltage on the filter capacitor $C_F$ 124 substantially follows the positive magnitude of the dimmer output voltage $V_{DO}$ 106. As such, the controller 136 may detect when the dimmer circuit 104 disconnects the ac input voltage $V_{AC}$ 102 from the power supply 100 by sensing the voltage on the filter capacitor $C_F$ 124 (or in other words the rectified voltage $V_{RECT}$ 110). In another embodiment, the controller 136 may detect when the dimmer circuit 104 disconnects the ac input voltage $V_{AC}$ 102 from the power supply 100 by sensing the switch current $I_D$ 144.

The switching power supply 100 utilizes the energy transfer element T1 112 to transfer voltage between the primary 114 and the secondary 116 windings. The clamp circuit 122 is coupled to the primary winding 114 to limit the maximum voltage on the switch SP 118. Switch SP 118 is opened and closed in response to the drive signal 138. It is generally understood that a switch that is closed may conduct current and is considered on, while a switch that is open cannot conduct current and is considered off. In operation, the switching of the switch SP 118 produces a pulsating current at the rectifier D1 126. The current in the rectifier D1 126 is filtered by the output capacitor C1 128 to produce a substantially constant output voltage $V_O$, output current $I_O$, or a combination of the two at the load 130.

The feedback circuit 132 senses the output quantity $U_O$ of the power supply 100 to provide the feedback signal $U_{FB}$ 134 to the controller 136. The feedback signal $U_{FB}$ 134 may be a voltage signal or a current signal and provides information regarding the output quantity $U_O$ to the controller 136. In addition, the controller 136 receives the current sense input signal 140 which relays the switch current $I_D$ 144 in the switch SP 118. The switch current $I_D$ 144 may be sensed in a variety of ways, such as for example the voltage across a discrete resistor or the voltage across a transistor when the transistor is conducting. In addition, the controller 136 may receive the voltage sense input signal 142 which relays the value of the rectified voltage $V_{RECT}$ 110. The rectified voltage $V_{RECT}$ 110 may be sensed a variety of ways, such as for example through a resistor divider.

The controller 136 may determine the phase angle by utilizing the switch current $I_D$ 144 provided by the current sense input signal 140, or the rectified voltage $V_{RECT}$ 110 provided by the voltage sense input signal 142 or a combination of the two. For example, the controller 136 measures the length of time during which the dimmer circuit 104 disconnects the ac input voltage $V_{AC}$ 102 from the power supply 100. In other words, the controller 136 measures the length of time during which the dimmer output voltage $V_{DO}$ 106 and the rectified voltage $V_{RECT}$ 110 are substantially equal to zero voltage. To measure the phase angle, the controller 136 divides the length of time during which the dimmer output voltage $V_{DO}$ 106 and the rectified voltage $V_{RECT}$ 110 are substantially equal to zero voltage by the length of time of the half line cycle. The controller 136 may then utilize the measured phase angle to determine when to transition between closed loop dimming control and open loop dimming control.

The controller 136 outputs a drive signal 138 to operate the switch SP 118 in response to various system inputs to substantially regulate the output quantity $U_O$ to the desired value when the controller 136 is operating in closed loop dimming control. In one embodiment, the drive signal 138 may be a rectangular pulse waveform with varying lengths of logic high and logic low sections, with the logic high value corresponding to a closed switch and a logic low corresponding to an open switch. In another embodiment, the drive signal may be comprised of substantially fixed-length logic high (or ON) pulses and regulated by varying the number of ON pulses per number of oscillator cycles.

The drive signal 138 may have various drive signal operating conditions such as the switch on-time $t_{ON}$ (typically corresponding to a logic high value of the drive signal 138), switch off-time $t_{OFF}$ (typically corresponding to a logic low value of the drive signal 138), switching frequency $f_S$, or duty cycle. During closed loop dimming control, the controller 136 responds to the feedback signal $U_{FB}$ 134 to determine one or more drive signal operating conditions. However, when the phase angle determined by the controller 136 exceeds the phase threshold, the controller 136 transitions to open loop dimming control and does not respond to the feedback signal $U_{FB}$ 134 to determine one or more drive signal operating conditions. In other words, once the phase angle exceeds the phase threshold (corresponding to the phase angle increasing from a low value to a higher value), the controller 136 holds the value of one or more drive signal operating conditions to their respective values determined by the controller 136 at the time the phase angle reaches the phase threshold. Since the controller 136 holds the value of the drive signal operating conditions, there is no discontinuity of the output power when the controller 136 transitions between closed loop dimming control and open loop dimming control. In one example, the drive signal operating conditions determined by the controller 136 may be the switch on-time $t_{ON}$ and the switching frequency $f_S$ when the phase threshold is substantially 145 degrees.

However, if the phase angle is initially greater than the phase threshold, the controller 136 begins in open loop dimming control and uses a predetermined value for the one or more drive signal operating conditions. If the phase angle decreases to less than the phase threshold, the controller 136 transitions to closed loop dimming control and begins to respond to the feedback signal $U_{FB}$ 134. Thus, when controller 136 transitions to closed loop dimming control the output power may transition from a value determined by the predetermined drive signal operating conditions to a value now determined by feedback signal $U_{FB}$ 134.

Referring next to FIG. 2A, a diagram of an example waveform of the rectified voltage $V_{RECT}$ 110 of the switching power supply 100 is illustrated including half line cycle $T_{HL}$ 202, a threshold voltage $V_{TH}$ 204, a peak voltage $V_P$ 206, and a section 210. FIG. 2B illustrates the section 210 and corresponding zero-crossing signal 212. The controller utilizes the zero-crossing signal 212 to measure the phase angle and determine when to transition between closed loop dimming and open loop dimming.

In general, the ac input voltage $V_{AC}$ 102 is a sinusoidal waveform with the period of the ac input voltage $V_{AC}$ 102 referred to as a full line cycle. Mathematically: $V_{AC}=V_P \sin(2\pi f_L t)$. Where $V_P$ 206 is the peak voltage of the ac input voltage $V_{AC}$ 102 and $f_L$ is the frequency of the line input voltage. Or in other words, $f_L$ is the frequency of the ac input voltage $V_{AC}$ 102. It should be appreciated that the full line cycle is the reciprocal of the line frequency $f_L$, or mathematically: full line cycle=$1/f_L$. Further, the half line cycle $T_{HL}$ 202 is the reciprocal of double the line frequency, or mathematically:

$$T_{HL} = \frac{1}{2f_L}.$$

The example rectified voltage $V_{RECT}$ 110 shown is the resultant output of the rectifier 108 and the dimming circuit 104. For the example of FIG. 2A, the beginning of each half line cycle $T_{HL}$ 202 of the rectified voltage $V_{RECT}$ 110 is substantially equal to zero voltage corresponding to when the dimmer circuit 104 disconnects the ac input voltage $V_{AC}$ 102 from the power supply. When the dimmer circuit 104 reconnects the ac input voltage $V_{AC}$ 102 to the power supply, the rectified voltage $V_{RECT}$ 110 substantially follows the positive magnitude of the ac input voltage $V_{AC}$ 102. Or mathematically: $V_{RECT}=|V_{DO}|$.

In one example, the threshold voltage $V_{TH}$ 204 is substantially equal to zero. In another example, the threshold voltage $V_{TH}$ 204 is substantially one fourth of the peak voltage $V_P$ 206 of the rectified voltage $V_{RECT}$ 110. It should be appreciated that as the value of the threshold voltage $V_{TH}$ 204 is closer to zero voltage, the more accurate the zero-crossing signal 212 indicates that the rectified voltage $V_{RECT}$ 110 is substantially equal to zero. However, the closer the value of the rectified voltage $V_{RECT}$ 110 is to zero voltage the more difficult it may be for the controller 136 to sense the value of the rectified voltage $V_{RECT}$ 110. In particular, the controller 136 may have some difficulty sensing the value of the rectified voltage $V_{RECT}$ 110 through the switch current $I_D$ 144 provided by the current sense signal 140 when the rectified voltage $V_{RECT}$ 110 is at or near zero voltage. In addition, the rectified voltage $V_{RECT}$ 110 may not reach zero due in part to the selected value of the filter capacitor $C_F$ 124. As such the controller 136 may utilize a non-zero threshold voltage $V_{TH}$ 204 to allow the sensing of the zero-voltage condition when the value of the rectified voltage $V_{RECT}$ 110 is at or near zero voltage.

FIG. 2B illustrates the section 210 of the rectified voltage $V_{RECT}$ 110 and the corresponding zero-crossing signal 212. Embodiments of the present invention utilize the zero-crossing signal 212 to determine the phase angle and subsequently transition the power supply 100 between closed loop dimming control and open loop dimming control. When the rectified voltage $V_{RECT}$ 110 is less than the threshold voltage $V_{TH}$ 204, the zero-crossing signal 212 is in a state which indicates that the rectified voltage $V_{RECT}$ 110 is less than the threshold voltage $V_{TH}$ 204. The zero-crossing signal 212 is a rectangular pulse waveform with logic high and logic low sections. For the example illustrated in FIG. 2B, when the rectified voltage $V_{RECT}$ 110 is less than the threshold voltage $V_{TH}$ 204, the value of the zero-crossing signal 212 is logic high. When the rectified voltage $V_{RECT}$ 110 is greater than threshold voltage $V_{TH}$ 204, the value of the zero-crossing signal 212 is logic low. As mentioned above, the rectified voltage $V_{RECT}$ 110 follows the positive magnitude of the ac input voltage $V_{AC}$ 102 once the dimmer circuit 104 reconnects the ac input voltage $V_{AC}$ 102 to the power supply 100. As such, determining when the rectified voltage $V_{RECT}$ 110 is near zero voltage would correspond to detecting when the ac input voltage $V_{AC}$ 102 crosses zero voltage, hence the term "zero-crossing."

However, since the dimmer circuit 104 disconnects the ac input voltage $V_{AC}$ 102 from the power supply, subsequent portions of the rectified voltage $V_{RECT}$ 110 are substantially equal to zero. As such, the zero-crossing signal 212 is in a state which indicates that the rectified voltage $V_{RECT}$ 110 is less than the threshold voltage $V_{TH}$ 204 (i.e. logic high in the example). The phase angle is a measure of how many degrees of each half line cycle $T_{HL}$ 202 the dimmer circuit removes from the ac input voltage $V_{AC}$ 102. Therefore by measuring the length of time during which the zero-crossing signal 212 is in a state which indicates that the rectified voltage $V_{RECT}$ 110 is less than the threshold voltage $V_{TH}$ 204 (i.e. logic high in the example) the controller 136 may measure the phase angle. For FIG. 2B, the length of time during which the zero-crossing signal is at the logic high value is denoted by $T_Z$ 218, herein referred to as the zero-crossing pulse width $T_Z$ 218. In accordance with embodiments of the present invention, the phase angle (expressed in degrees) may be calculated by dividing the zero-crossing pulse width $T_Z$ 218 by the half line cycle $T_{HL}$ 202 and then multiplying by one hundred and eighty, or mathematically:

$$\text{phase angle (expressed in degrees)} = \frac{T_Z}{T_{HL}}(180).$$

The controller 136 may also indirectly determine the phase angle from the average value of the ac input voltage after the dimmer circuit has removed a portion of the ac input voltage. A smaller average value of the dimmer circuit output would correspond to a larger phase angle. As such, the controller 136 may utilizes this relationship to indirectly determine the phase angle and transition the power supply 100 between closed loop dimming control and open loop dimming control. However, the accuracy of the phase angle measured through the average value of the dimmer circuit output would be dependant on variances of the ac input voltage. By counting the length of the zero-crossing pulse width $T_Z$ 218 and comparing it to the half line cycle $T_{HL}$ 202, the controller 136 may calculate the phase angle of the dimmer circuit 104 independent of the shape of the ac input voltage $V_{AC}$ 102 and independent of variations in the ac input voltage $V_{AC}$ 102.

It should be appreciated that the dimmer circuit 104 also includes an input (not shown) which provides the dimmer circuit 104 with information regarding the amount of dimming wanted. The longer the dimmer circuit 104 disconnects the ac input voltage $V_{AC}$ 102 from the power supply, the longer the rectified voltage $V_{RECT}$ 110 is substantially equal to zero voltage. As a result, the length of the zero-crossing pulse width $T_Z$ 218 corresponds to the amount of dimming provided by the dimmer circuit 104 and the corresponding phase angle.

As will be further discussed, the controller 136 uses a counter to determine the length of the zero-crossing pulse width $T_Z$ 218. The counter starts counting when the zero-crossing signal 212 pulses to the logic high value, indicated in FIG. 2B by start time $t_{START}$ 214. The counter stops counting when the zero-crossing signal 212 pulses to the logic low value, indicated in FIG. 2B by stop time $t_{STOP}$ 216. The count at stop time $t_{STOP}$ 216 which is outputted from the counter is one example of the measurement of the length of the zero-crossing pulse width $T_Z$ 218. In one example, the counter may continue counting for the length of half line cycle $T_{HL}$ 202 and the controller may determine the phase angle. In another example, the controller 136 utilizes a fixed count for the half line cycle $T_{HL}$ 202. For example, the controller 136 may fix the total count for the half line cycle $T_{HL}$ 202 to 320 counts. When the total count for the half line cycle $T_{HL}$ 202 is fixed, each possible degree of the phase angle would be fixed to a specific count of the zero-crossing pulse width $T_Z$ 218. The total count per half line cycle $T_{HL}$ 202 may be chosen such that the percentage error per count is within acceptable tolerance levels. The greater the total count per half line cycle $T_{HL}$ 202, the smaller the percentage error per count, or mathematically: error per count $$\text{(expressed as a percentage)} = \frac{1}{M}(100),$$

where M is the total count for the half line cycle $T_{HL}$ 202. If the total count for the half line cycle $T_{HL}$ 202 is equal to 100 the percentage error per count would be 1%. If the total count for the half line cycle $T_{HL}$ 202 is equal to 320 counts, the percentage error per count would be 0.31%. As will be discussed further, FIGS. 4, 5, 6A, and 6B illustrate how the controller 136 determines the phase angle and uses the determined phase angle to facilitate the transition between closed loop dimming control and open loop dimming control.

Referring next to FIG. 3A, another example waveform of the rectified voltage $V_{RECT}$ 310 is illustrated including half line cycle $T_{HL}$ 302, threshold voltage $V_{TH}$ 304, peak voltage $V_P$ 306, and section 311. FIG. 3B illustrates the section 311 of the rectified voltage $V_{RECT}$ 310 and the corresponding zero-crossing signal 312. The half line cycle $T_{HL}$ 302, threshold voltage $V_{TH}$ 304, and the peak voltage $V_P$ 306 may be further examples of the half line cycle $T_{HL}$ 202, threshold voltage $V_{TH}$ 204, and the peak voltage $V_P$ 206 shown in FIGS. 2A and 2B.

The example waveform of the rectified voltage $V_{RECT}$ 310 is similar to the rectified voltage $V_{RECT}$ 110 shown in FIG. 2A. In the example of FIG. 2A, the rectified voltage $V_{RECT}$ 110 is the result of the dimmer circuit 104, such as a triac dimmer, which disconnects the ac input voltage $V_{AC}$ 102 at the beginning of every half line cycle $T_{HL}$ 202. However, the rectified voltage $V_{RECT}$ 310 illustrated in FIGS. 3A and 3B is a result of a dimmer circuit 104 which disconnects the ac input voltage $V_{AC}$ 102 at the end of every half line cycle $T_{HL}$ 302. As a result, the rectified voltage $V_{RECT}$ 310 is substantially equal to zero voltage at the end of the half line cycle $T_{HL}$ 302. At the beginning of the half line cycle $T_{HL}$ 302, the rectified voltage $V_{RECT}$ 310 substantially follows the positive magnitude of the ac input voltage $V_{AC}$ 102 until the dimmer circuit 104 disconnects the ac input voltage $V_{AC}$ 102 from the power supply 100. The value of the rectified voltage $V_{RECT}$ 310 then falls to substantially zero voltage until the beginning of the next half line cycle.

FIG. 3B illustrates the section 311 of the rectified voltage $V_{RECT}$ 310 and the corresponding zero-crossing signal 312. Embodiments of the present invention utilize the zero-crossing signal 312 to determine the phase angle and subsequently the amount of dimming for the power supply 100. When the rectified voltage $V_{RECT}$ 310 is less than the threshold voltage $V_{TH}$ 304, the zero-crossing signal 312 indicates that the zero-crossing condition exists. For the example of FIG. 3B, when the rectified voltage $V_{RECT}$ 310 is less than the threshold voltage $V_{TH}$ 304, the value of the zero-crossing signal 312 is at a logic high value. When the rectified voltage $V_{RECT}$ 310 is greater than the threshold voltage $V_{TH}$ 304, the value of the zero-crossing signal 312 is at the logic low value.

As mentioned above, the length of time during which the zero-crossing signal 312 is at the logic high value indicating the zero-crossing condition exists is referred to as the zero-crossing pulse width $T_Z$ 318. The length of the zero-crossing pulse width $T_Z$ 318 may be utilized to measure the phase angle indicated by dimmer circuit 104. The phase angle may be calculated by comparing the zero-crossing pulse width $T_Z$ 318 with the half line cycle $T_{HL}$ 302, or mathematically: phase angle $$\text{(expressed in degrees)} = \frac{T_Z}{T_{HL}}(180).$$

The controller 136 may use a counter to determine the length of the zero-crossing pulse width $T_Z$ 318. The counter starts counting when the zero-crossing signal 312 pulses to the logic high value, indicated in FIG. 3B by start time $t_{START}$ 314. The counter stops counting when the zero-crossing signal 312 pulses to the logic low value, indicated in FIG. 3B by stop time $t_{STOP}$ 316. The count at stop time $t_{STOP}$ 316 which is outputted from the counter is one example of the measurement of the zero-crossing pulse width $T_Z$ 318. As will be discussed further, FIGS. 4, 5, 6A, and 6B illustrate how the controller 136 determines the phase angle and uses the determined phase angle to facilitate the transition between closed loop dimming control and open loop dimming control.

Figure 4:
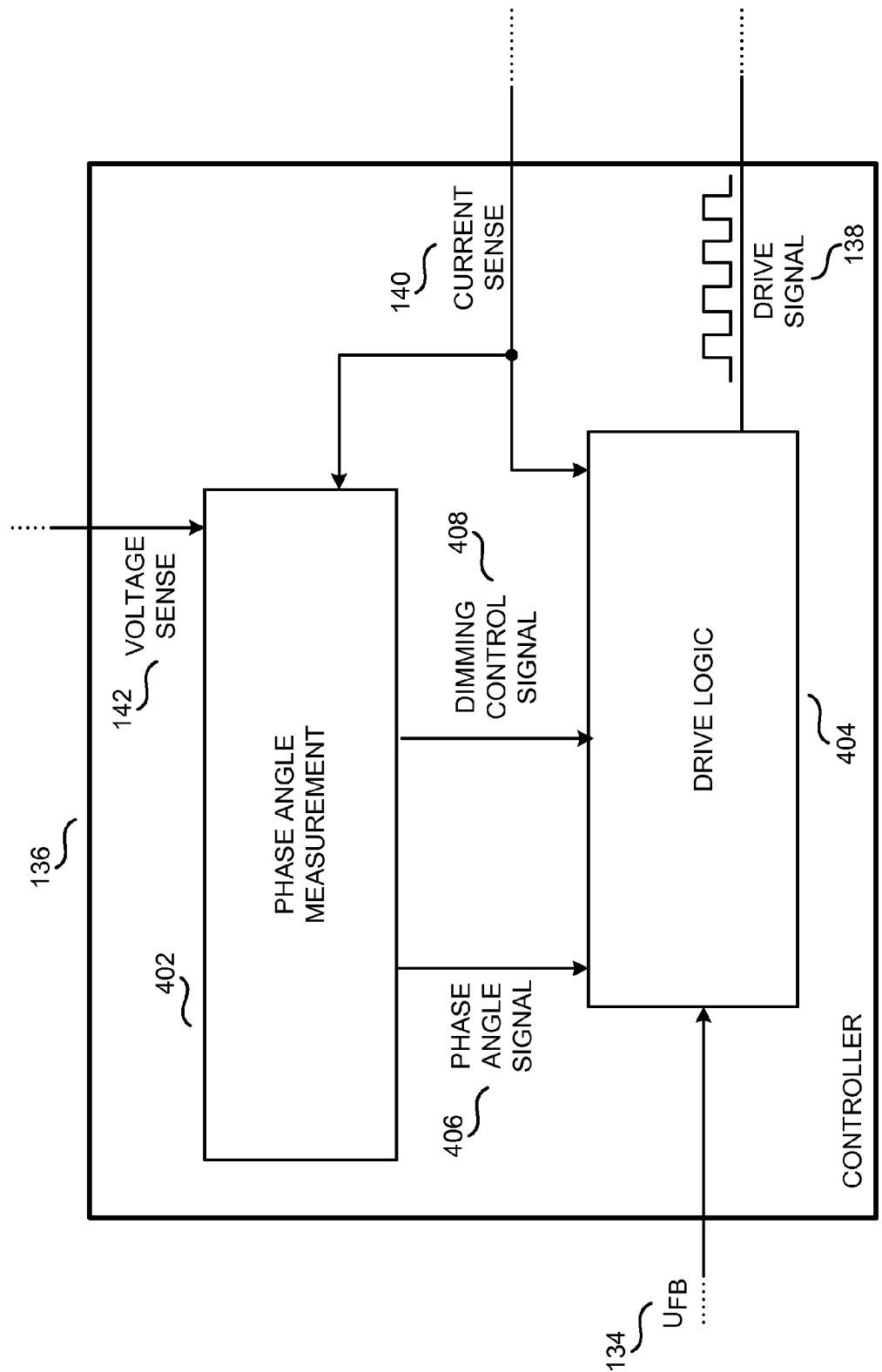
FIG. 4 is a functional block diagram of a controller in accordance with an embodiment of the present invention.

Referring next to FIG. 4, a functional block diagram of a controller 136 is illustrated including feedback signal $U_{FB}$ 134, drive signal 138, current sense input signal 140, voltage sense input signal 142, a phase angle measurement block 402, a phase angle signal 406, a dimming control signal 408 and a drive logic block 404.

The feedback signal $U_{FB}$ 134, drive signal 138, current sense input signal 140, and voltage sense input signal 142 couple and function as described above. The controller 136 further includes the phase angle measurement block 402 which couples to and receives the current sense input signal 140. The phase angle measurement block 402 may also receive the voltage sense input signal 142. The current sense input signal 140 and/or the voltage sense input signal 142 may be referred to as an input sense signal. The input sense signal provides the phase angle measurement block 402 with information regarding the rectified voltage $V_{RECT}$ 110. Drive logic block 404 couples to and receives the phase angle signal 406 and the dimming control signal 408 from the phase angle measurement block 402. In addition, the drive logic block 404 receives the feedback signal $U_{FB}$ 134 and the current sense signal 140. The drive logic block 404 utilizes the various received signals to determine one or more drive signal operating conditions and outputs the drive signal 138 to control switching of the switch SP 118.

As mentioned above, the voltage sense signal 142 is representative of the rectified voltage $V_{RECT}$ 110. However, the voltage sense signal 142 may also be representative of the dimmer output voltage $V_{DO}$ 106. In addition, the current sense input signal 140 is representative of the switch current $I_D$ 144. In operation, the phase angle measurement block 402 may determine the phase angle by utilizing the switch current $I_D$ 144 provided by the current sense input signal 140, or the rectified voltage $V_{RECT}$ 110 provided by the voltage sense input signal 142 or a combination of the two. As will be further mentioned below, the phase angle measurement block 402 may determine the value of the rectified voltage $V_{RECT}$ 110 from the switch current $I_D$ 144 provided by the current sense input signal 140. The phase angle measurement block 402 outputs the determined phase angle as phase angle signal 406 to the drive logic block 404. In addition, the phase angle measurement block 402 outputs the dimming control signal 408 to the drive logic block 404. The dimming control signal 408 may indicate to the drive logic block 404 when the determined phase angle is greater than or less than the phase threshold. In other words, the dimming control signal 408 may indicate when the drive logic block 404 should be operating in open loop dimming control or closed loop dimming control.

In operation, the drive logic block 404 utilizes the received phase angle signal 406, dimming control signal 408, feedback signal $U_{FB}$ 134, and/or the current sense input signal 140 to determine one or more drive signal operating conditions and outputs the drive signal 138. For example, the drive logic block 404 may utilize the phase angle signal 406 to determine the amount of dimming wanted. In other words, the phase angle signal 406 may be utilized to determine the desired value of the output quantity $U_O$ of the power supply 100. When the dimming control signal 408 indicates that the drive logic block 404 should be operating in closed loop dimming control (in other words, the determined phase angle is less than a phase threshold), the drive logic block responds to the feedback signal $U_{FB}$ 134 and determines the one or more drive signal operating conditions such that the output quantity $U_O$ is regulated to the desired value (which is partially determined by the phase angle signal 406). When the dimming control signal 408 indicates that the drive logic block 404 should be operating in open loop dimming control (in other words, the determined phase angle is greater than a phase threshold), the drive logic block 404 does not respond to the to the feedback signal $U_{FB}$ 134. In addition, the drive logic block 404 holds the value of one or more of the drive signal operating conditions to the value of these conditions at the phase threshold. However, if the phase angle is initially greater than the phase threshold, the drive logic block 404 begins operation in open loop dimming control and uses a predetermined value for the one or more drive signal operating conditions. If the phase angle decreases to less than the phase threshold, the drive logic block 404 transitions to closed loop dimming control and responds to the feedback signal $U_{FB}$ 134. The drive logic block 404 may also optionally receive the current sense input signal 140. In one example the current sense input signal 140 may indicate when the switch current $I_D$ 144 has reached a maximum current limit and the switch SP 118 should be turned off. The drive logic block 404 may then output the drive signal 138 to turn off the switch SP 118.

Figure 5:
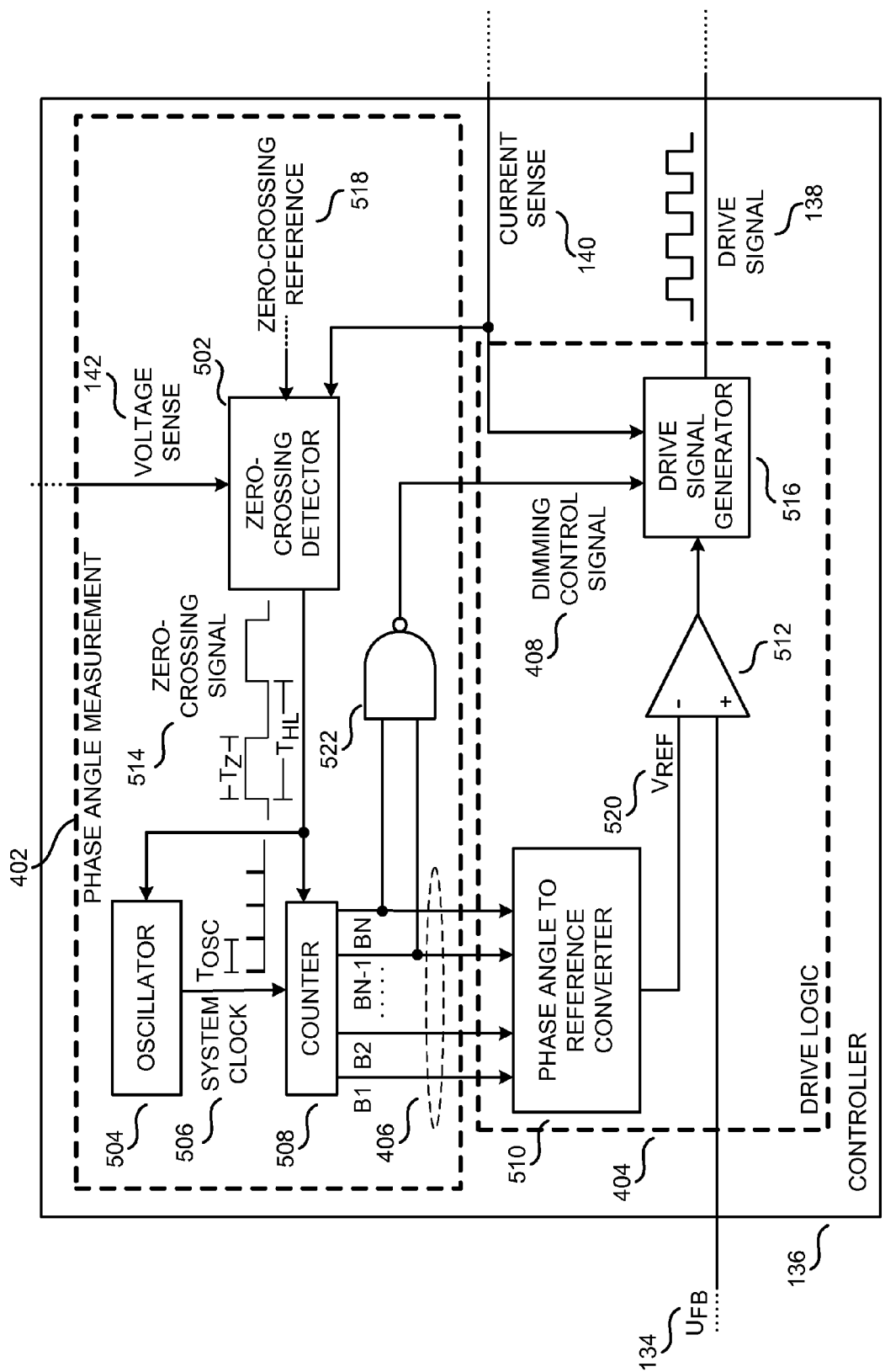
FIG. 5 is a functional block diagram of a phase angle measurement block and drive logic block of the controller of FIG. 4.

Referring next to FIG. 5, a functional block diagram of a phase angle measurement block 402 and drive logic block 404 of controller 136 is illustrated including feedback signal $U_{FB}$ 134, drive signal 138, current sense input signal 140, voltage sense input signal 142, phase angle signal 406, dimming control signal 408, a zero-crossing detector 502, an oscillator 504, a system clock signal 506, a counter 508, a phase angle to reference converter 510, an amplifier 512, a zero-crossing signal 514, a drive signal generator 516, a zero-crossing reference 518, a reference voltage 520, and a NAND gate 522 (i.e., a logic gate). The zero-crossing signal 514 is one example of the zero-crossing signal illustrated in FIGS. 2B and 3B. FIG. 5 illustrates one embodiment of how the controller 136 measures the phase angle and generates the dimming control signal 408. In addition, FIG. 5 illustrates one example of how the phase angle is utilized to change the reference voltage 418 to facilitate dimming of the output of the power supply 100.

The feedback signal $U_{FB}$ 134, drive signal 138, current sense input signal 140, voltage sense input signal 142, phase angle measurement block 402 and drive logic block 404 couple and function as described above. The controller 136 further includes the zero-crossing detector 502 which couples to and receives the current sense input signal 140 and the zero-crossing reference 518. The zero-crossing detector 502 may also receive the voltage sense input signal 142. The zero-crossing reference 518 represents the threshold voltage $V_{TH}$ (as discussed as threshold voltage $V_{TH}$ 204 and 304) and the zero-crossing detector 502 outputs the zero-crossing signal 514. As mentioned above, the zero-crossing signal 514 indicates when the zero-crossing condition exists, or in other words when the rectified voltage $V_{RECT}$ 110 falls below the threshold voltage $V_{TH}$. The zero-crossing signal 514 is a rectangular pulse waveform with varying lengths of logic high and logic low sections. The length between consecutive rising edges of the zero-crossing signal 412 is substantially equal to the half line cycle $T_{HL}$. In addition, the length of time of the logic high sections is substantially equal to zero-crossing pulse width $T_Z$. In one example, the zero-crossing detector 502 receives information regarding the rectified voltage $V_{RECT}$ 110 from the voltage sense signal 142 and the zero-crossing detector 502 generates the zero-crossing signal 514 utilizing the voltage sense signal 142 and the zero-crossing reference 518. In another example, the zero-crossing detector 502 receives information regarding the rectified voltage $V_{RECT}$ 110 from the switch current $I_D$ 144 provided by the current sense signal 140 and the zero-crossing detector 502 generates the zero-crossing signal 514 utilizing the current sense signal 140 and the zero-crossing reference 518. In a further example, the zero-crossing detector 502 receives information regarding the rectified voltage $V_{RECT}$ 110 from both the voltage sense signal 142 and the current sense signal 140 and generates the zero-crossing signal 514 utilizing the current sense signal 140, voltage sense signal 142 and the zero-crossing reference 518.

The relationship between voltage and current of the switch SP 118 when the switch SP 118 is ON may be expressed as:

$$V(t) = L_P \frac{di(t)}{dt},$$

where $L_P$ is the inductance of the primary winding 114. For power supplies operating in discontinuous conduction mode (DCM), this relationship during any switching cycle may be further expressed as:

$$V_{AC} = L_P \frac{I_{PEAK}}{t_{ON}},$$

where $I_{PEAK}$ is the peak value of the switch current $I_D$ 144 and $t_{ON}$ is the on-time of the switch SP 118. However, in one switching cycle the value of $V_{AC}$ may be considered a constant since the on-time $t_{ON}$ is small relative to the half line cycle $T_{HL}$. For the example shown in FIG. 1, $$V_{RECT} = L_P \frac{I_{PEAK}}{t_{ON}},$$

as such the zero-crossing detector 402 may determine the value of the rectified voltage $V_{RECT}$ 110 from the switch current $I_D$ 144. The controller 136 may fix a zero-crossing current threshold $I_{ZC}$ and the zero-crossing time threshold $t_{ZC}$ to correspond to the threshold voltage $V_{TH}$ (204 and 304) utilizing the relationship between voltage and current of the switch SP 118 when the switch SP 118 is ON in DCM, or mathematically:

$$V_{TH} = L_P \frac{I_{ZC}}{t_{ZC}}.$$

The zero-crossing detector 402 may determine that the rectified voltage $V_{RECT}$ 110 is less than the threshold voltage $V_{TH}$ (204 and 304) by determining when the peak value of the switch current $I_D$ 144 is less than the zero-crossing current threshold $I_{ZC}$. For one embodiment, the zero-crossing current threshold $I_{ZC}$ is one example of the zero-crossing reference 416.

The zero-crossing detector 502 couples to the counter 508 and the counter 508 receives the zero-crossing signal 514. In addition, the counter 508 couples to the oscillator 504 and receives a system clock signal 506 from the oscillator 504. In one example, the oscillator 504 is a line-synchronized oscillator. In one example, the system clock signal 506 is a rectangular pulse waveform with varying lengths of logic high and logic low sections. The length of time between consecutive rising edges is substantially equal to the oscillator period $T_{OSC}$. The oscillator frequency $f_{OSC}$ may be chosen to be a multiple of the half line frequency $f_{HL}$, or mathematically: $f_{OSC}=Mf_{HL}$, M>1, where M is a positive integer. In other words, the half line cycle $T_{HL}$ ($T_{HL}=1/f_{HL}$) is a multiple of the oscillator period, $T_{OSC}$ ($T_{OSC}=1/f_{OSC}$), or mathematically:

$$T_{OSC} = \frac{1}{M} T_{HL}, M > 1.$$

As mentioned above, the value of M also refers to the total count per half line cycle $T_{HL}$. In one example, the value of M is 320. The oscillator 504 may further couple to the zero-crossing detector 502 and receives the zero-crossing signal 514. As will be further discussed, the oscillator 504 may utilize the zero-crossing signal 514 to determine the half line cycle $T_{HL}$, or in other words the half line frequency $f_{HL}$. When the oscillator 504 is a line-synchronized oscillator, the oscillator 504 may adjust the oscillator frequency $f_{OSC}$ such that the value of M is substantially constant.

The counter 508 is a binary counter which increments in response to the system clock signal 506 received from the oscillator 504. Or in other words, the counter 508 is a binary counter which increments at every cycle of the oscillator 504. The counter 508 begins counting at the rising edge of the zero-crossing signal 514 (shown as start time $t_{START}$ 214 and 314 with respect to FIGS. 2B and 3B) and the counter 508 continues to count for the length of the zero-crossing pulse width $T_Z$. In one example, the counter 508 then stops counting at the next falling edge of the zero-crossing signal (shown as stop time $t_{STOP}$ 216 and 316 with respect to FIGS. 2B and 3B). The internal count of the counter 508 is then outputted to the phase angle to reference converter 510 as bits B1 through BN. Bits B1 through BN may be referred to as the phase count. In addition, bits B1 through BN may also be referred to as the phase angle signal 406. In one example, B1 is the least significant bit (LSB) and BN is the most significant bit (MSB). In one example, the counter 508 resets back to zero at the falling edge of the zero-crossing signal 514.

In another example, the counter 508 begins counting at the rising edge of the zero-crossing signal 514 and the counter 508 continues to count for the length of the zero-crossing pulse width $T_Z$. At the next falling edge, the counter 508 forwards the internal count to the phase angle to reference converter 510 as bits B1 through BN (phase angle signal 406). However, the counter 508 does not reset its internal count until the next rising edge of the zero-crossing signal 514. In one embodiment, the counter 508 is a plurality of flip-flops arranged to form an asynchronous counter or a synchronous counter. The phase count (B1 through BN) outputted from counter 508 as phase angle signal 406 is representative of the phase angle. Specifically, the phase count (B1 through BN) outputted from counter 508 is representative of the phase angle when the total count M of every half line cycle $T_{HL}$ is fixed. Or in other words, the phase count (B1 through BN) outputted from counter 508 is representative of the phase angle when $$T_{OSC} = \frac{1}{M} T_{HL}$$

and M is substantially constant. When the total count M is equal to 320, a 90 degree phase angle would correspond to the counter 508 counting to a phase count of 160. In another example, a 45 degree phase angle, corresponding to the dimmer circuit 104 disconnecting the ac input voltage VAC 102 for a quarter of the half line cycle $T_{HL}$, would correspond to the counter 406 counting to a phase count of 80.

FIG. 7 is a table 700 illustrating example counts of counter 508. As mentioned above, the counter 508 increments at every cycle of the system clock signal 506 when the zero-crossing signal 514 is at the logic high value. For an internal count value of 0, bits B1, B2 and B3 are a logic low value. For an internal count value of 1, bit B1 is at the logic high value while bits B2 and B3 remain at the logic low value. For an internal count of value 7, bits B1, B2 and B3 are at the logic high value. Table 700 illustrates a 3-bit counter, however it should be appreciated any number of bits may be included in counter 406.

Referring back to FIG. 5, the phase angle to reference converter 510 couples to the counter 508 and receives the phase angle signal 406 (B1 through BN). The phase angle to reference converter 510 converts the received phase angle signal 406 (B1 through BN) into reference voltage $V_{REF}$ 520. In example, the higher the offset phase count (B1 through BN) the lower the reference voltage $V_{REF}$ 520. A D/A converter (not shown) included in phase angle to reference converter 510 may be utilized to convert the phase angle signal 406 (B1 through BN) into reference voltage $V_{REF}$ 520.

The phase angle to reference converter 510 further couples to a feedback reference circuit, also referred to as amplifier 512, such that the amplifier 512 receives the reference voltage $V_{REF}$ 520. The amplifier 512 also receives the feedback signal $U_{FB}$ 134. The feedback signal $U_{FB}$ 134 provides the drive logic block 404 with information regarding the output quantity $U_O$ of the power supply 100. As shown in FIG. 5, the reference voltage $V_{REF}$ 520 is received at the inverting input of the amplifier 512 while the feedback signal $U_{FB}$ 134 is received at the non-inverting input of the amplifier 512. The output of the amplifier 512 (i.e., feedback reference circuit) further couples to drive signal generator 516. The drive signal generator 516 also couples to and receives the current sense input signal 140 and the dimming control signal 408. As discussed above, the current sense input signal 140 represents the switch current $I_D$ 144.

The dimming control signal 408 indicates when the drive signal generator 516 should be operating in open loop dimming control or closed loop dimming control. In other words, the dimming control signal 408 indicates when the phase angle is greater than or less than the phase threshold. As mentioned above, the phase angle signal 406 (B1 through BN) outputted from counter 508 is representative of the phase angle when the total count M of every half line cycle $T_{HL}$ is fixed. As such, the phase angle signal 406 (B1 through BN) may be utilized to determine if the phase angle is greater than or less than the phase threshold. Looking back to table 700 of FIG. 7, if the phase threshold was set at the value 4, the controller 136 could determine that the phase angle was greater than or equal to the value of 4 when the most significant bit MSB (B3 of table 700) is at a logic high value (i.e. the value 1). Further, if the phase threshold was set at the value 6, the controller 136 could determine that the phase angle was greater than or equal to the value 6 when the MSB (B3) and the second most significant bit (B2) are both at a logic high value. As such, depending on the number of bits for the counter 508 and the phase threshold, the dimming control signal 408 may be determined by the value of the MSB, the second most significant bit, and so on. For the controller 136 shown in FIG. 5, the dimming control signal 408 indicates that the phase angle is greater than or equal to the phase threshold when BN and BN−1 are both logic high values. As shown in FIG. 5, BN and BN−1 are coupled to the inputs of NAND gate 522. The output of NAND gate 522 is the dimming control signal 408. When both BN and BN−1 are logic high corresponding to a measured phase angle greater than the phase threshold, the dimming control signal 408 is a logic low value indicating that the controller 136 should be utilizing open loop dimming control. When either value of BN or BN−1 is not logic high, the dimming control signal 408 is a logic high value indicating that the controller should be utilizing closed loop dimming control.

Utilizing the output of the amplifier 512 and dimming control signal 408, and current sense input signal 140, the drive signal generator 516 outputs the drive signal 138 which operates the switch SP 118. In closed loop dimming control, the drive signal generator 516 utilizes the output of amplifier 512 (which responds to the feedback signal $U_{FB}$ 134) to determine operating conditions of the drive signal 138 to regulate the output quantity $U_O$ to the desired value. In open loop dimming control, the drive signal generator does not utilize the output of amplifier 512 to determine the operating conditions of the drive signal 138. Further, the drive signal generator 516 holds the values of the operating conditions of the drive signal 138 determined at the phase threshold.

Figure 6A:
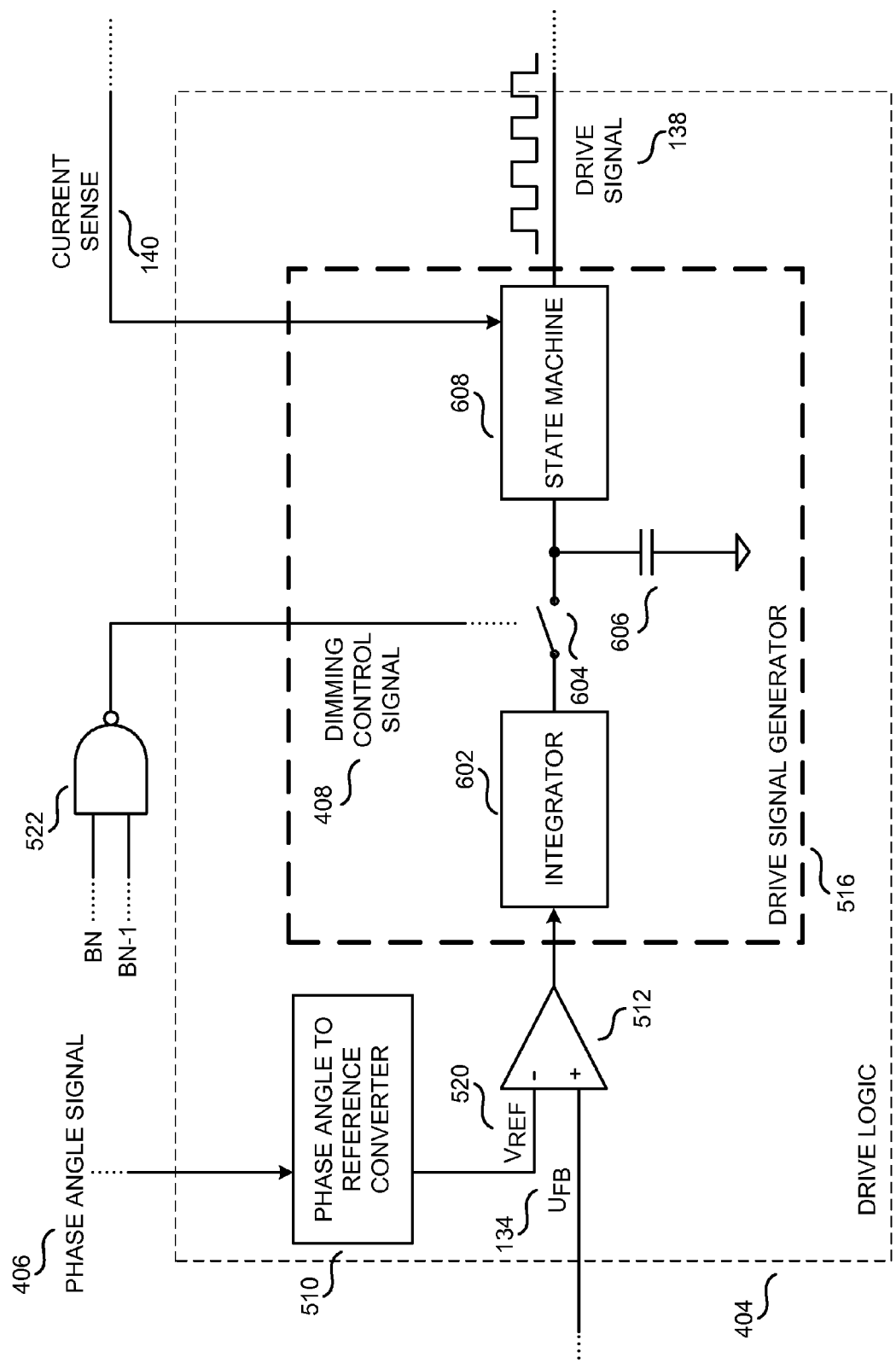
FIG. 6A is a functional block diagram illustrating one embodiment of the drive logic block of FIG. 4.

Referring next to FIG. 6A, a functional block diagram of the drive logic block 404 and the drive signal generator 516 is illustrated including feedback signal $U_{FB}$ 134, drive signal 138, current sense input signal 140, phase angle signal 406, dimming control signal 408, phase angle to reference converter 510, amplifier 512, reference voltage 520, NAND gate 522, an integrator 602, a dimming control switch 604, a hold capacitor 606, and a state machine 608. FIG. 6A illustrates the transition between closed loop dimming control and open loop dimming control implemented by the drive signal generator 516.

The feedback signal $U_{FB}$ 134, drive signal 138, current sense input signal 140, phase angle signal 406, dimming control signal 408, phase angle to reference converter 510, amplifier 512, reference voltage $V_{REF}$ 520, and NAND gate 522 couple and function as described above. The drive signal generator 516 further includes an integrator 602 which couples to and receives the output of amplifier 512. The integrator 602 couples to the dimming control switch 604. Dimming control switch 604 is further coupled to hold capacitor 606 and to state machine 608. The state machine 608 outputs the drive signal 138 which controls switching of the switch SP 118. In one example, the state machine 608 includes ordinary digital circuits (not shown) such as for example logic gates, flip-flops, latches, counters, and the like, to produce outputs and schedule future switching cycles that are enabled or disabled in response to past and present input from integrator 602 in accordance with the teachings of the present invention.

In operation, the output of the integrator 602 is forwarded to the state machine 608 when the dimming control switch 604 is closed. The dimming control signal 408 controls the opening and closing of the dimming control switch 604. When the dimming control signal 408 indicates closed loop dimming control, the dimming control switch 604 is closed. When the dimming control signal 408 indicates open loop dimming control, the dimming control switch 604 is open. In closed loop operation, the state machine 608 sets the operating conditions in which the controller 136 controls the switch SP 118 based on the value outputted from the integrator 602 at the time the integrator 602 is updated. In one embodiment, the integrator is updated at every half line cycle $T_{HL}$. The integrator 602 receives the output of the amplifier 512. The integrator 602 integrates the feedback signal $U_{FB}$ 134 over a half line cycle $T_{HL}$ to partially determine whether the power supply 100 is delivering the correct amount of power. In one example, a counter is utilized for the integrator 602. When the output of the amplifier is logic high corresponding to the feedback signal $U_{FB}$ 134 being greater than the reference voltage $V_{REF}$ 520, the integrator 602 counts down by one. When the output of the amplifier 512 is a logic low value corresponding to the reference voltage $V_{REF}$ 520 being greater than the feedback signal $U_{FB}$ 134, the integrator 602 counts up by one. At the end of the half line cycle $T_{HL}$, the final count of the integrator 602 is received by the state machine 608. In one embodiment, a positive count of the integrator 602 corresponds to not enough power being delivered to the output while a negative count of the integrator 602 corresponds to too much power being delivered to the output. The state machine 608 sets the operating conditions of the drive signal 138 based on the value outputted from the integrator 602 when the integrator 502 is updated. In addition, the value outputted from the integrator 602 is held at the hold capacitor 606.

In open loop dimming control, the dimming control switch 604 is open. The state machine 608 utilizes the value stored at the hold capacitor 606 to set the operating conditions of the drive signal 138. As such, the state machine 608 does not change states until the dimming control switch 604 closes again. In other words, the state machine 608 does not respond to the feedback signal $U_{FB}$ 134. However, if the phase angle is initially greater than the phase threshold such that the power supply 100 is operating in open loop dimming control, there is no value outputted from the integrator 602 stored at the hold capacitor 606. As such the state machine 608 sets the operating conditions of the drive signal 138 based on a predetermined state. When the phase angle increases from a low value to a higher value, the state machine tracks the feedback signal $U_{FB}$ 134 when the dimming control switch 604 is closed and holds the operating conditions of the drive signal 138 when the dimming control switch 604 is open.

Figure 6B:
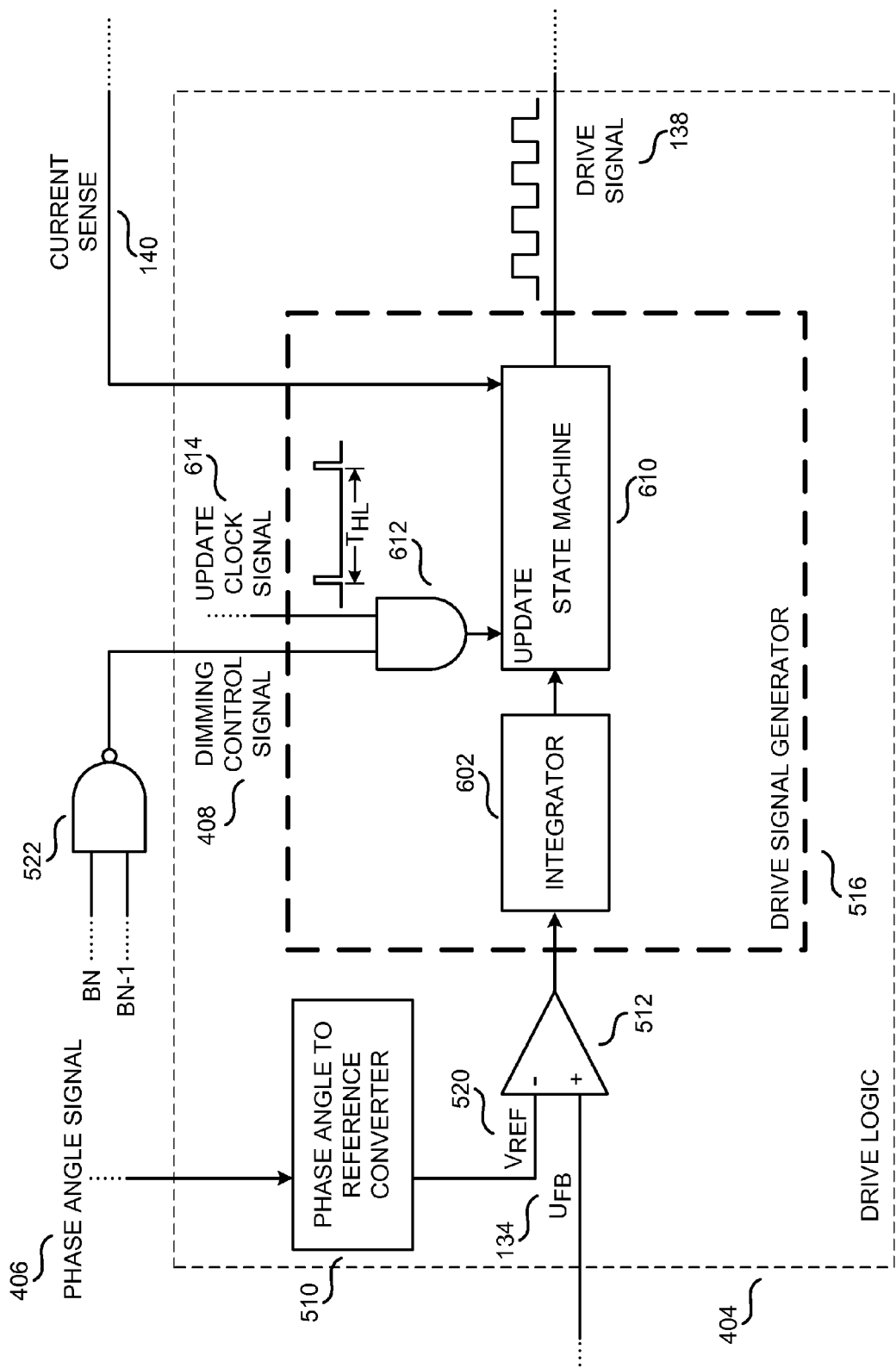
FIG. 6B is a functional block diagram illustrating another embodiment of the drive logic block of FIG. 4.

Referring next to FIG. 6B, another functional block diagram of the drive logic block 404 and the drive signal generator 516 is illustrated including feedback signal $U_{FB}$ 134, drive signal 138, current sense input signal 140, phase angle signal 406, dimming control signal 408, phase angle to reference converter 510, amplifier 512, reference voltage 520, NAND gate 522, integrator 602, state machine 610, AND gate 612, and update clock signal 614. FIG. 6B further illustrates the transition between closed loop dimming control and open loop dimming control implemented by the drive signal generator 516.

The feedback signal $U_{FB}$ 134, drive signal 138, current sense input signal 140, phase angle signal 406, dimming control signal 408, phase angle to reference converter 510, amplifier 512, reference voltage $V_{REF}$ 520, and NAND gate 522 couple and function as described above. The drive signal generator 516 further includes the integrator 602 which couples to and receives the output of amplifier 512. State machine 610 further couples to and receives the output of integrator 602. In addition, the state machine 610 couples to the output of AND gate 612. The output of AND gate 612 updates the state machine 610. The inputs of AND gate 612 receive the dimming control signal 408 and the update clock signal 614. The update clock signal 614 is a rectangular pulse waveform which pulses to a logic high value at every half line cycle $T_{HL}$. The state machine 610 outputs the drive signal 138 which controls switching of the switch SP 118. In one example, the state machine 610 includes ordinary digital circuits (not shown) such as for example logic gates, flip-flops, latches, counters, and the like, to produce outputs and schedule future switching cycles that are enabled or disabled in response to past and present input from integrator 602 in accordance with the teachings of the present invention.

In operation, the controller 136 may transition between closed loop dimming control and open loop dimming control by controlling when the state machine 610 updates. The integrator 602 receives the output of the amplifier 512. The integrator 602 integrates the feedback signal $U_{FB}$ 134 over a half line cycle $T_{HL}$, to partially determine whether the power supply 100 is delivering the correct amount of power. The state machine 610 sets the operating conditions in which the controller 136 controls the switch SP 118 based on the value outputted from the integrator 602 when the state machine 610 is updated. Illustrated in FIG. 6B, the state machine 610 updates when the output of the AND gate 612 is a logic high value. As such, the state machine 610 updates when the update clock signal 614 pulses to a logic high value (updates at every half line cycle $T_{HL}$) and the dimming control signal 408 is at a logic high value (corresponding to the dimming control signal 408 indicating that the phase angle is less than the phase threshold). In other words, when the controller 136 is operating in closed loop dimming control, the state machine 610 updates when the update clock signal 614 pulses to a logic high value. For open loop dimming control, the dimming control signal 408 is at a logic low value and holds the output of the AND gate 612 at a logic low value which keeps the state machine 610 from updating. As such, the operating conditions of the drive signal 138 are held to their values at the phase threshold. In other words, by keeping the state machine 610 from updating, the state machine 610 does not respond to the feedback signal $U_{FB}$ 134.

Figure 8A:
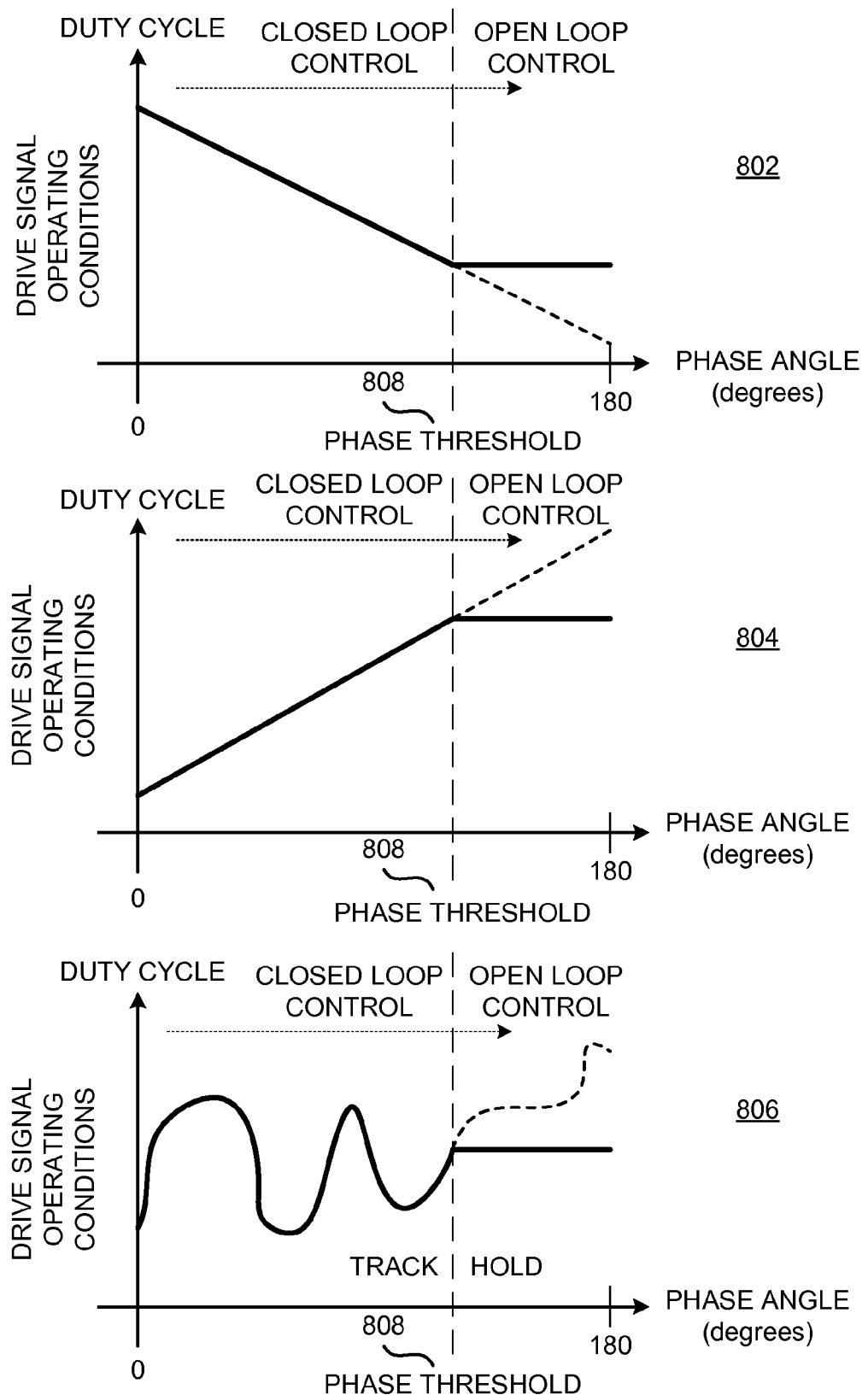
FIG. 8A is a graph illustrating a relationship between drive signal operating conditions and phase angle when phase angle is increasing in accordance with an embodiment of the present invention.

Referring next to FIG. 8A, the relationship between drive signal operating conditions and phase angle when phase angle is increasing is illustrated including graphs 802, 804, and 806, and phase threshold 808. For the example graphs, the drive signal operating condition illustrated is the duty cycle. FIG. 8A illustrates a single drive signal operating condition, however, any number of operating conditions may utilize embodiments of the present invention.

Graph 802 illustrates the value of the drive signal operating condition decreasing as the phase angle increases. However when the phase angle reaches the phase threshold 808, the controller 136 transitions from closed loop dimming control to open loop dimming control. As such, the drive signal operating condition is held at a constant value. In one embodiment, the drive signal operating condition is held constant at its values when the phase angle reached the phase threshold 808. The dashed line shown in graph 802 illustrates the value of the drive signal operating condition if the controller did not transition to open loop dimming control.

Graph 804 illustrates the value of the drive signal operating condition increasing as the phase angle increases. Once the phase angle reaches the phase threshold 808, the drive signal operating condition is held to a constant value. In one embodiment, drive signal operating condition is held constant at its value when the phase angle reached the phase threshold 808. The dashed line shown in graph 804 illustrates the value of the drive signal operating condition if the controller did not transition to open loop dimming control.

Graph 806 illustrates the value of the drive signal operating condition varying as the phase angle increases. Once the phase angle reaches the phase threshold 808, the drive signal operating condition is held to a constant value. In one embodiment, drive signal operating condition is held constant at its value when the phase angle reached the phase threshold 808. The dashed line shown in graph 806 illustrates the value of the drive signal operating condition if the controller did not transition to open loop dimming control.

It should be appreciated, however, that the value of the drive signal operating conditions may be determined by several factors, such as phase angle, the output of the power supply, and the value of the input voltage. Graphs 802, 804, and 806 represent different schemes for determining the drive signal operating condition. However, in accordance with embodiments of the present inventions, once the phase angle reaches the phase threshold 808, the controller 136 transitions to open loop dimming control and the drive signal operating condition is held to a constant value. Graphs 802, 804 and 806 also illustrate that when the phase angle increases from a low value to a high value, there is a smooth transition in the output power between closed loop dimming control and open loop dimming control since there is no jump of the value of the drive signal operating condition at the phase threshold.

Figure 8B:
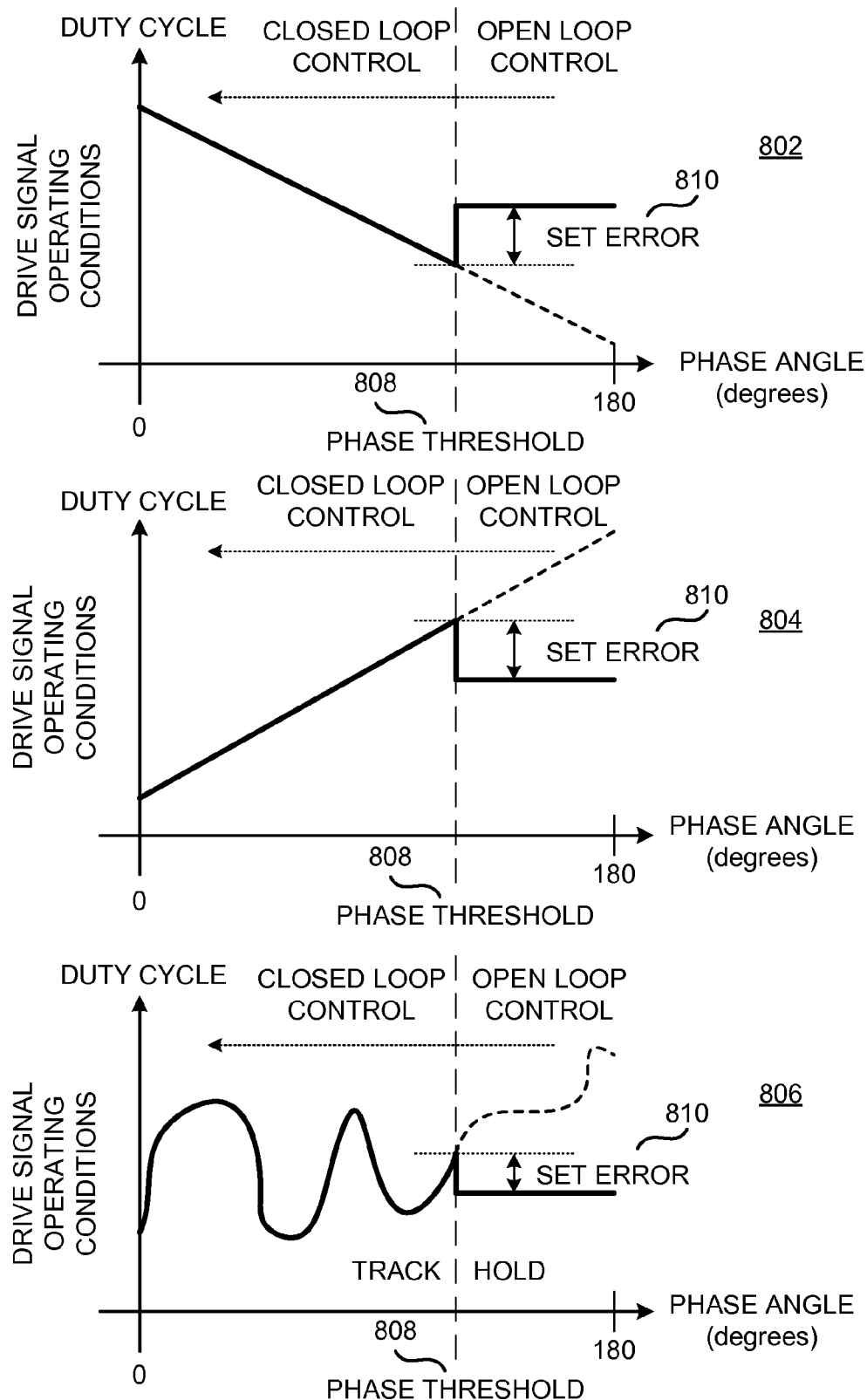
FIG. 8B is a graph illustrating a relationship between drive signal operating conditions and phase angle when phase angle is initially greater than the phase threshold and the phase angle is decreasing in accordance with an embodiment of the present invention.

Referring next to FIG. 8B, the relationship between drive signal operating conditions and phase angle when phase angle is decreasing is illustrated including graphs 802, 804, and 806, phase threshold 808 and set error 810. For the example graphs, the drive signal operating condition illustrated is the duty cycle. FIG. 8B illustrates what may occur to the drive signal operating condition when the phase angle is initially greater than the phase threshold 808 at start-up.

In graph 802, the drive signal operating condition is substantially at a constant value when the phase angle is greater than the phase threshold 808 at start-up of the power supply. Once the phase angle decreases below the phase threshold 808, the controller 136 transitions to closed loop dimming control and the drive signal operating condition begins to increase as phase angle decreases. However, as mentioned above, when the phase angle is initially greater than the phase threshold 808 the drive signal operating condition is set at a predetermined value. The set error 810 illustrates the error between the value of the drive signal operating condition in open loop dimming and the determined value of the drive signal operating condition once closed loop dimming control resumes. When the phase angle is increasing, the set error 810 does not occur because the value of the drive signal operating condition is held from when the controller 136 was operating in closed loop dimming control. Graphs 804 and 806 illustrate other schemes for determining the drive signal operating condition.

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for a power supply having a dimmer circuit coupled to an input of the power supply, the controller comprising:
   a measurement block to be coupled to receive an input sense signal and to determine an amount of time that the dimmer circuit disconnects an ac input voltage from the input of the power supply based on the input sense signal; and
   a drive block coupled to the measurement block and coupled to generate a drive signal to control switching of a switch included in the power supply, wherein the drive block operates a closed loop dimming control in response to an output of the measurement block indicating that the amount of time is less than or equal to a threshold, wherein the closed loop dimming control includes setting one or more operating conditions of the drive signal in response to a feedback signal that is representative of an output quantity of the power supply, and wherein the drive block operates an open loop dimming control in response to the output of the measurement block indicating that the amount of time is greater than the threshold, wherein open loop dimming control includes holding the one or more operating conditions of the drive signal to a value.

2. The controller of claim 1, wherein the one or more operating conditions includes one or more condition selected from the group consisting of switching frequency, switch on-time, switch off-time, and duty cycle.

3. The controller of claim 1, wherein the drive block sets the value of the one or more operating conditions of the drive signal when the amount of time is equal to the threshold, and holds the one or more operating conditions to the value when the amount of time is greater than the threshold.

4. The controller of claim 1, wherein the value is a predetermined value and the drive logic block holds the one or more operating conditions to the predetermined value when the amount of time is greater than the threshold.

5. The controller of claim 1, wherein the input sense signal is a voltage sense signal representative of a dimmer output voltage of the dimmer circuit.

6. The controller of claim 1, wherein the input sense signal is a current sense signal representative of a switch current through the switch.

7. The controller of claim 1, wherein the input sense signal is a voltage sense signal representative of a rectified input voltage of the power supply.

8. The controller of claim 1, wherein the measurement block includes a logic gate coupled to generate the output of the measurement block that is representative of whether the amount of time is greater than the threshold.

9. The controller of claim 1, wherein the measurement block includes a counter coupled to generate the output of the measurement block that is a digital signal representative of the amount of time that dimmer circuit disconnects the ac input voltage from the input of the power supply.

10. A controller for a power supply having a dimmer circuit coupled to an input of the power supply, the controller comprising:
a measurement block to be coupled to receive an input sense signal and to determine an amount of time that the dimmer circuit disconnects an ac input voltage from the input of the power supply based on the input sense signal; and
a drive circuit coupled to the measurement block and coupled to control switching of a switch included in the power supply, wherein the drive circuit controls switching of the switch in response to a feedback signal when an output of the measurement block indicates that the amount of time is less than or equal to a threshold, and wherein the drive circuit controls switching of the switch independent of the feedback signal when the output of the measurement block indicates that the amount of time is greater than the threshold, wherein the feedback signal is representative of an output quantity of the power supply.

11. The controller of claim 10, wherein the drive circuit generates a drive signal to control switching of the switch, and wherein the drive circuit sets one or more operating conditions of the drive signal selected from the group consisting of switching frequency, switch on-time, switch off-time, and duty cycle.

12. The controller of claim 11, wherein the drive circuit sets the one or more operating conditions of the drive signal to a value responsive to the feedback signal in response to the output of the measurement block indicating that the amount of time is equal to the threshold, and wherein the drive circuit holds the one or more operating conditions to the value in response to the output of the measurement block indicating that the amount of time is greater than the threshold.

13. The controller of claim 11, wherein the drive circuit sets the one or more operating conditions of the drive signal to a predetermined value in response to the output of the measurement block indicating that the amount of time is transitioning from less than the threshold to greater than the threshold and wherein the drive circuit holds the one or more operating conditions to the predetermined value in response to the output of the measurement block indicating that the amount of time is greater than the threshold.

14. The controller of claim 10, wherein the input sense signal is a voltage sense signal representative of a dimmer output voltage of the dimmer circuit.

15. The controller of claim 10, wherein the input sense signal is a current sense signal representative of a switch current through the switch.

16. The controller of claim 10, wherein the input sense signal is a voltage sense signal representative of a rectified input voltage of the power supply.

17. The controller of claim 10, wherein the measurement block includes a logic gate coupled to generate the output of the measurement block that is representative of whether the amount of time is greater than the threshold.

18. The controller of claim 10, wherein the measurement block includes a counter coupled to generate the output of the measurement block that is a digital signal representative of the amount of time that dimmer circuit disconnects the ac input voltage from the input of the power supply.

19. A controller for a power supply having a dimmer circuit coupled to an input of the power supply, the controller comprising:
a measurement block to be coupled to receive an input sense signal and to generate a dimming control signal in response thereto, wherein the dimming control signal indicates whether an amount of time that the dimmer circuit disconnects an ac input voltage from the input of the power supply is greater than a threshold; and
a drive circuit coupled to the measurement block and to be coupled to control switching of a switch included in the power supply, wherein the drive circuit controls switching of the switch in response to a feedback signal when the dimming control signal indicates that the amount of time is less than or equal to the threshold, and wherein the drive circuit controls switching of the switch independent of the feedback signal when the dimming control signal indicates that the amount of time is greater than the threshold, wherein the feedback signal is representative of an output quantity of the power supply.

20. The controller of claim 19, wherein the drive circuit comprises:
a feedback reference circuit coupled to receive the feedback signal and a reference signal; and
a drive signal generator coupled to receive the dimming control signal and an output of the feedback reference circuit, wherein the drive signal generator generates the drive signal responsive to the output of the feedback reference circuit when the dimming control signal indicates that the amount of time is less than or equal to the threshold, and wherein the drive signal generator generates the drive signal independent of the output of the feedback reference circuit when the amount of time is greater than the threshold.

21. The controller of claim 20, wherein the drive signal generator comprises:
an integrator coupled to receive the output of the feedback reference circuit and coupled to generate a value representative of the output quantity of the power supply;
a state machine coupled to generate the drive signal and to set one or more operating conditions of the drive signal; and
a dimming control switch coupled between the integrator and the state machine, wherein the dimming control switch is coupled to be open in response to the dimming control signal indicating that the amount of time is greater than the threshold and closed responsive to the dimming control signal indicating that the amount of time is not greater than the phase threshold, and wherein the state machine sets the one or more operating conditions of the drive signal responsive to the value generated by the integrator when the dimming control switch is closed.

22. The controller of claim 21, wherein the drive signal generator further comprises a hold capacitor coupled between the dimming control switch and the state machine to store the value generated by the integrator, wherein the state machine sets the one or more operating conditions of the drive signal responsive to the value stored in the hold capacitor when the dimming control switch is open.

23. The controller of claim 20, wherein the drive signal generator comprises:
   an integrator coupled to receive the output of the feedback reference circuit and coupled to generate a value representative of the output quantity of the power supply; and
   a state machine coupled to generate the drive signal and to update one or more operating conditions of the drive signal responsive to the value generated by the integrator when the dimming control signal indicates that the amount of time is less than or equal to the threshold, and wherein the state machine does not update the one or more operating conditions and does not respond to the value generated by the integrator when the dimming control signal indicates that the amount of time is greater than the threshold.

* * * * *